(12) United States Patent
Lindberg et al.

(10) Patent No.: US 6,732,109 B2
(45) Date of Patent: May 4, 2004

(54) METHOD AND SYSTEM FOR TRANSFERRING INFORMATION BETWEEN A USER INTERFACE AND A DATABASE OVER A GLOBAL INFORMATION NETWORK

(75) Inventors: Henrik Lindberg, Djursholm (SE); Thomas Hallgren, Plainsboro, NJ (US)

(73) Assignee: The EON Company, New York, NY (US)

( * ) Notice: Subject to any disclaimer, the term of this patent is extended or adjusted under 35 U.S.C. 154(b) by 300 days.

(21) Appl. No.: 09/773,348

(22) Filed: Jan. 31, 2001

(65) Prior Publication Data

US 2003/0028540 A1 Feb. 6, 2003

(51) Int. Cl.[7] .............................................. G06F 17/30
(52) U.S. Cl. ..................... 707/101; 707/10; 707/103; 707/104
(58) Field of Search .................. 707/103, 101, 707/102, 104, 10, 204; 709/217, 223, 227

(56) References Cited

U.S. PATENT DOCUMENTS

| | | | | |
|---|---|---|---|---|
| 5,761,672 A | * | 6/1998 | Samuelsson et al. | 707/10 |
| 5,873,093 A | * | 2/1999 | Williamson et al. | 707/103 R |
| 5,953,722 A | * | 9/1999 | Lampert et al. | 707/100 |
| 6,122,641 A | * | 9/2000 | Williamson et al. | 707/103 R |
| 6,185,574 B1 | * | 2/2001 | Howard et al. | 707/200 |
| 2002/0124113 A1 | * | 9/2002 | Gargya et al. | 709/246 |

* cited by examiner

Primary Examiner—Jean M. Corrielus

(74) Attorney, Agent, or Firm—Davidson, Davidson & Kappel, LLC

(57) ABSTRACT

A relational database residing on a second computer, and is accessed by a user interface via a global information network such as the Internet. The relational database is accessed through four intermediate processing layers: an interaction layer, an application layer, a business object layer, and an information model layer, each located on a second computer, with the information model layer logically adjacent to the database, and the interaction layer logically adjacent to the user interface operating on the browser. The information model layer maintains a first relational tree of the information in the relational database. This relational tree appears as a plurality of entities in a mark up language (such as XML) to the business object layer and the information in the relational database is accessible via the relational tree. The business object model layer includes a plurality of business object instances, each of which maintains a second relational tree corresponding to a portion of the first relational tree. The second relational tree appears as a plurality of entities in a mark up language (such as XML) to the application layer. The application layer includes a plurality of application object instances, each of which includes an application object definition which specifies one or more methods and business object instances available to the application object. The application layer appears as a plurality of entities in a mark up language to the interaction layer. The interaction layer includes a plurality of interaction objects, each interaction object including information identifying an application object and information specifying a manner in which requests from a user interface are to be processed for transmission to the application object and in which responses from the application object are to be transmitted to the user interface. The interaction layer appears as a plurality of entities in a mark up language to the user interface.

30 Claims, 4 Drawing Sheets

METHOD AND SYSTEM FOR TRANSFERRING INFORMATION BETWEEN A USER INTERFACE AND A DATABASE OVER A GLOBAL INFORMATION NETWORK

FIELD OF THE INVENTION

This invention relates to software architecture and more particularly to a software architecture for web-based systems.

BACKGROUND OF THE INVENTION

To develop a web site, web pages are created in a hyper-text markup language (HTML) and stored on a server connected to the Internet and some mass data storage device such as a database. Web hosting companies develop the software and maintain the hardware that provide web-based services for a client, or tenant. Web-site specific applications are also created and customized for each tenant's specific needs. In addition to applications, tenants are likely to need distinct versions of each web page for each type of browser the page is likely to encounter because web browsers are incompatible. For example, one version of a page may be necessary for Microsoft Explorer and another for Netscape Navigator. Moreover, different versions of pages will be necessary for wireless telephone browsers as opposed to browsers designed for conventional computer display screens.

Typical web-hosting services have multiple tenants, each with different needs. It is often the case that some tenants actually have conflicting needs so that the system has to be flexible enough to handle the different needs between tenants and agile enough so that each tenant only uses the logic necessary to do its own processing. This balance is extremely difficult to achieve and so it is not uncommon that web-based systems go through large amounts of logic, performing useless verification processes.

With mobile devices that can access the web, more problems are encountered with publishing web site content. Support for devices with screens of varying size must be provided in addition to changing pre-existing server pages designed for a web browser, which calls for reconstructing the logic behind web pages.

Within every system, there are business rules, or logic, that represent constraints and policies to govern how system information can be modified or accessed while safeguarding the integrity of the application's data. As a system grows, more rules are added and pre-existing rules changed, increasing complexity and making it harder to decipher processing logic when modifying the logic at a later time.

As software is developed and built for multi-tenant services, the system is exposed to the combined changes of all tenants. The information model, which is the sum of all information needed to support all the system users, must be adapted to each specific user's needs in viewing the information who work for different departments, each with a different view of the business world. Information models are typically modeled to suit the initial needs of a system when it is first built. As each new feature or departmental view needs to be supported there is usually a need to change the information model.

However, developers tend to resist making changes to the information model. This often results in using part of the information model for purposes it was not designed.

Although this may be the most expedient solution, it almost inevitably causes unexpected complications. For example, assume that a user needs to track the lifecycle of a high priced item, such as a car. If there is no such object in the information model of the system, an object that does have lifecycle support, such as a project object, may be modified to view as a car by copying the project user interface and modifying it accordingly. Alternatively, the developer might use the project object without modification, for example, by introducing a special project-type code, which is not part of the information model but is introduced into the code using the information model. In the event the project object is overhauled, the entire support for the car object would have to be reconstructed. Such changes are particularly troublesome if the database is used by multiple tenants (using the same instance), or if the information model is part of the software delivered to the customer (requiring a time consuming software update). But this was the problem the developer was trying to avoid in the first place by using the information model for purposes it was not designed for rather than modifying the information model.

In the prior art systems, there is no, or poor separation of concern between the structure of information and the structure of its use. In the project example discussed above, although the information structures (Car and Project) were almost identical, the implementation included project semantics in the information model. In other words, each implementation included structures that were specific to each particular application. The best solution would have been an abstract information model. Unfortunately, when using an "abstract model," the developer writing the business logic must use the structures of the model which, because they are "abstract", necessarily have abstract and difficult names. Therefore, the developer cannot express the logic in well-known terms. Moreover, because the abstract structures are generic to multiple uses, the developer may need to use several layers of "mental indirection" to obtain the desired result. Therefore, while an abstract information model is very flexible, its abstract nature makes the resulting logic difficult for users and subsequent developers to understand. Separation is needed between the need for an information model capable of holding all of the information in a flexible (adaptable and changeable) way, and the need for the users of the information to understand and work with the information.

The Ovum Model (Engineering for Change: The Ovum six-layer reference model, Neil Ward-Dutton, February 1997), incorporated herein by reference, attempts to address the problems of the prior art by providing a six layer architecture. The Ovum Model, however, merely recites a collection of requirements, without any description or indication of how its architecture should be implemented.

SUMMARY OF THE INVENTION

In accordance with an embodiment of the present invention, a system for transferring information between a user interface and a database over a global information network such as the Internet is provided. A plurality of user interfaces are located on a plurality of user computers. In this regard, the user interfaces are implemented on a browser using a mark up language such as HTML. The database is a relational database residing on a second computer, and is accessed by the user interface via a global information network such as the Internet. In accordance with the present invention, the relational database is accessed through four intermediate processing layers: an interaction layer, an application layer, a business object layer, and an information model layer, each located on a second computer, with the information model layer logically adjacent to the database, and the interaction layer logically adjacent to the user interface operating on the browser. It should be noted that the "second computer" could be a single computer which implements the interaction layer, an application layer, business object layer, information model layer, and relational database, or could comprise multiple computers located in a single or multiple locations, connected, for example, via a LAN or WAN. Preferably, the information at each layer of the system above the database layer is in a form which is immediately renderable on a user interface. Most preferably, the information in each of these layers is in the form of an XML document.

As explained in more detail below, the use of these four intermediate layers provides a separation of concern for developers of applications of the information in the database and is particularly useful in supporting multiple tenancies on the relational database. For example, the accounting department, human services department, production department, and research and development department of a first company will have the need to access overlapping data in the relational database, but each will need this information for a substantially different purpose. The corresponding departments of a second company will have needs which are similarly overlapping, yet different, from both each other and the corresponding departments of the first company. Through the use of the present invention, each department can view the relational database in its own specific context, and can modify the appearance of the database to suit its particular needs without affecting the other tenants (e.g. other companies) or of different departments within a single tenant.

In accordance with this embodiment, the information model layer maintains a first relational tree of the information in the relational database. This relational tree appears as a plurality of entities in a mark up language (such as XML) to the business object layer and the information in the relational database is accessible via the relational tree. In the context of the present invention, the nomenclature of "appearing as entities . . . in a mark up language" means that the information model is accessed by the next higher layer as if it were a mark up language document such as an XML document. In this regard, the "entity" could either be a mark up language document (such as an XML document) or a process which acts as a proxy for a mark up language document. In any event, from the perspective of the business object layer, the information model layer is a set of mark up language documents, and is, in effect, the data. Preferably, the information model entities are XML documents which include item elements which define the attributes of the entity, and relationship elements which define relationships to other entities and to the underlying relational database.

The business object model layer includes a plurality of business object instances, each of which maintains a second relational tree corresponding to a portion of the first relational tree. The second relational tree appears as a plurality of entities in a mark up language (such as XML) to the application layer.

Taking the example mentioned above with regard to various departments in a company, the information model layer would provide an objective view of the information in the relational database, whereas the business object instances would provide subjective views which relate to specific intended uses. For example, the information model might be organized as follows:

| Person | | |
|---|---|---|
| [0] | [1] | [2] |
| John Smith | Joe Klein | Gerry Paul |
| Vehicle | Vehicle | Vehicle |
| Truck | Car | Truck | Car |
| GMC 5 | Ford Taurus | Mack Truck 3 | Ford Escort 1 |
| Class | Class | Class | Class |
| 4 axle Truck | Full Size Car | 3 Axle Truck | Compact Car |

In contrast, a business object instance which was concerned with product deliveries might organize the same information as follows:

| Vehicle Delivery | | | |
|---|---|---|---|
| Truck Large | Truck Small | Compact Car | Full Size Car |
| GMC 5 | Mack Truck 3 | Ford Escort | Ford Taurus |
| Driver | Driver | Driver | Driver |
| John Smith | Gerry Paul | Gerry Paul | Joe Klein |

In this manner, each business object instance can organize and label the data in a manner which is more useful to its particular uses, without requiring any changes to the information model layer. Preferably, the business object layer is comprised of a plurality of business object instances, each of which is defined as an XML document. Preferably, each business object instance implements its relational tree using one or more of a composite element, a set element, an instance element, and an item element. An item element is an entity which has a value, whereas the set elements, composite elements and instance elements define structures. An instance element corresponds to a leaf on the relational tree. In other words, an instance element holds item elements. For example, a person instance may have an item called "Birthday", and for a particular Person(Joe Smith) the value of the Birthday item is "Mar. 8, 1959". In this example, the instance element represents a Person(Joe Smith), and a set element could refer to a plurality of instance elements (e.g. Person (Joe Smith, John Doe, Mary Jane)). A composite element represents a structure, and is a sub-element of the set element and instance element. In this regard, an instance element includes a single composite element, whereas a set element includes a plurality of composite elements. The composite element includes item elements and may include set elements, and instance elements (which may in turn contain other composite elements). As discussed in more detail below, each of these elements includes "attributes" (such as the elements name and its relationship (if any) to a target object on the first relational tree) and may include sub-elements (e.g., an instance element may include an item sub-element).

The application layer includes a plurality of application object instances, each of which includes an application object definition which specifies one or more methods and business object instances available to the application object. The methods are operable to implement behavior requested by a user interface using information from the relational database accessed through the specified business object instances. The application layer appears as a plurality of entities in a mark up language to the interaction layer.

The interaction layer includes a plurality of interaction objects, each interaction object including information identifying an application object and information specifying a manner in which requests from a user interface are to be processed for transmission to the application object and in which responses from the application object are to be transmitted to the user interface. The interaction layer appears as a plurality of entities in a mark up language to the user interface. As mentioned above, the user interface preferably includes a browser located on a computer, and is displayed as a plurality of web pages generated from a plurality of entities in a mark up language (such as HTML or XML).

In accordance with another embodiment of the present invention, a database system is provided in which all information in the database is maintained in a form which is immediately renderable on a user interface. In accordance with this embodiment, a method of organizing data includes providing a first plurality of data entities and a second plurality of data entities. Each of the second plurality of data entities is generated by processing at least one of the first plurality of data entities and each of the first and second plurality of data entities are immediately renderable to a human via a user interface.

DETAILED DESCRIPTION OF THE PREFERRED EMBODIMENTS

In accordance with a preferred embodiment of the present invention, a software architecture is provided whereby concerns are separated among a number of layers so that changes are isolated and contained within a layer. The separation of concerns to the individual layers creates the ability to efficiently deliver functionality to multiple tenants in the same system while allowing for the modification of necessary logic at each level independently with virtually all changes occurring within a layer, thereby localizing change and enabling the introduction of new or modified functionality in a controlled fashion. In contrast, changes made in a conventional architecture tend to cause a domino-effect throughout the system, requiring almost every part of the system to be slightly modified.

Figure 1:
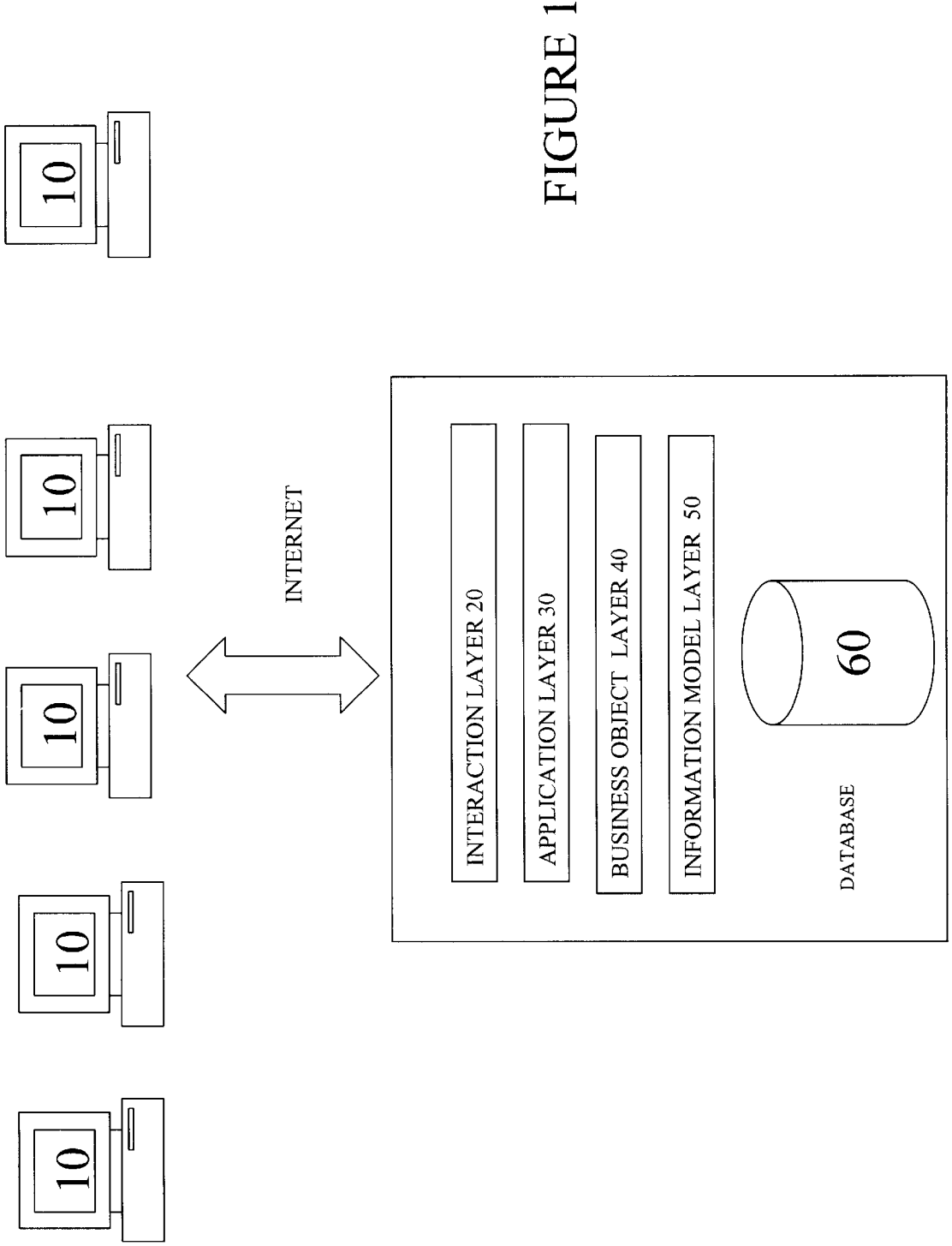
FIG. 1 illustrates a system in accordance with an embodiment of the present invention including a plurality of user interfaces located on a plurality of first computers, and a second computer including a relational database, an information model layer, a business object layer, an application layer, and an interaction layer.

In the architecture according to a preferred embodiment of the present invention, separation of concern and division of overall responsibilities and behavior is provided between logical components. Preferably, concerns are separated among a number of domains, each with its own set of tasks and responsibilities, such as a platform domain, a distributed computing domain, a services domain, and a business components domain. The platform domain includes the fundamental computing platform of the system, i.e., the hardware and operating system. Preferably, an object-oriented programming (OOP) language is used, such as Java, to provide an abstraction of the underlying platform. The distributed computing domain defines the mechanisms used to distribute the overall workload of the system to a set of hosts, or machines. Preferably, concepts such as Java Remote Method Invocation (RMI), JIM, CORBA, and Microsoft COM+ are used. The services domain contains the fundamental services used (directly or indirectly) by almost all of the higher order domains, such as security and transaction coordination. Facilities are higher order services that are typically used some of the time and for a specific purpose. Examples of facilities are Internationalization facilities, Print facilities etc. The business components domain handles interaction between the system and the user. Referring to FIG. 1, the business components domain is divided into sub-domains, or layers:

User interface layer 10 deals with data presentation and user interaction. Accommodating different technologies with specific user interface needs requires changes to the user interface only. In addition, where one system needs multiple channels, i.e., different channels for different browsers, support for the multiple channels is isolated to the user interface so that adding or removing support for a channel involves changes to the user interface only.

Interaction layer 20 defines how the user interface (or more technical interfaces for machine-to-machine communication) gains access to and communicates with the application objects, session management, and user interface/channel specific rendering.

Application objects layer 30 contains the "server side application logic." The objects in this layer are reusable over multiple user interface channels, i.e., one set of logic can be used for multiple channels. The specifics of each channel are the concern of the interaction layer 20. Application objects contain the logic that defines processing behind graphical user interface (GUI) buttons.

Business objects layer 40 provides a view of the underlying information model adapted to suit one or more specific uses. The business object layer acts as a liaison between the information model and the application objects, making the underlying abstract information model easier to use for a defined set of business uses.

Information model layer 50 contains all the persistent entities and relationships for the system information needed to support the business objects in the system. It is the sum of all information needed in all the various use cases supported by the system.

Database layer 60 is the relational database. This layer deals with all the aspects of persistent storage in a relational database. The database (DB) domain deals with the logical and physical aspects of storing information persistently.

In the above architecture, only content is passed from layer to layer with no shared processing. In this regard, the Business Object layer appears to the Application Object layer as an XML (eXtensible Markup Language) document, the Application Object layer appears to the Interaction layer as an XML document, and Interaction layer appears to the User Interface as an XML document. The User Interface itself, is an XML or HTML (Hypertext Markup Language) document. In addition, the Information Model layer essentially appears to the Business Object layer as an XML document, with some additional non-XML technology (such as SQL) used to support the interface between the two layers. Nevertheless, in the context of the present invention, the Information Model layer is considered to appear to the Business Object layer as an XML document, despite the existence of non-XML technology to support the interface. Although the architecture of FIG. 1 for providing layers 20–60 is illustrated as implemented as a single computer, it should be noted that a plurality of computers could also be used. For example, Internet communications and possibly interaction layer 20 might be run on one computer, the application and business object layers 30, 40 could run on a second computer, and the information model and database layers 50, 60 could run on a third computer.

The separation of concern provided in the above architecture has a number of advantages. For example, because of the separation between the database and information model layer, structures in the database layer can be optimized for operational reasons without affecting the higher levels. The layout of data can be denormalized (storing the same logical element in several different tables to avoid heavy join operations) for high performance. Such alterations are local to the database layer and do not affect the information model. The information model, in turn, is the sum of all the required information for all usage of the system combined for all tenants, i.e., handling all the information for multiple organizations. Due to the separation of concern between the Information Model and Database layers, the Information Model can be fully normalized while the database, for performance reasons, is not. This allows developers to ignore database operational issues in constructing the information model layer and other higher layers. Developers additionally do not have to be concerned with the different uses for the information when constructing the information model because these concerns are the province of the business objects layer.

In addition, isolation of the Information Model layer from the business objects layer allows application developers to be free of the all-encompassing and abstract information model. Isolation of the Business Model, in turn, allows the Business Model objects to be reusable for a variety of applications. Application objects deal with the functions in the Information Model as seen by users. For example, in an application for transferring money between two accounts, the application object would perform a withdraw and a deposit on two different accounts (the business objects). The Business objects, however, are not cluttered with a myriad of operations for various applications, thus making them reusable. The isolation of the business objects provides for construction in a way that presents the information, and operations on the information, in terms understood by business application developers.

Information Model and Database

The information model ("IM") is a normalized object model. Since it is the sum of all the required information in the system, the information is modeled in an abstract fashion; i.e. in accord with the nature of the information (objectively) as opposed to being modeled to suit a specific need (subjectively). The information model stores information without concern or regard for the specific needs of individual users and groups.

For example, the accounting department would have a different view of 'a customer' than the production department at a telecom company. The former is concerned with billing address and service enabling, and the latter with installation address and maintenance contracts. At the objective level, a customer object may be configured to include all information about the customer without specific information needs. Subjectively, a customer object is configured to contain the information specifically needed by some user, or use.

Figure 2:
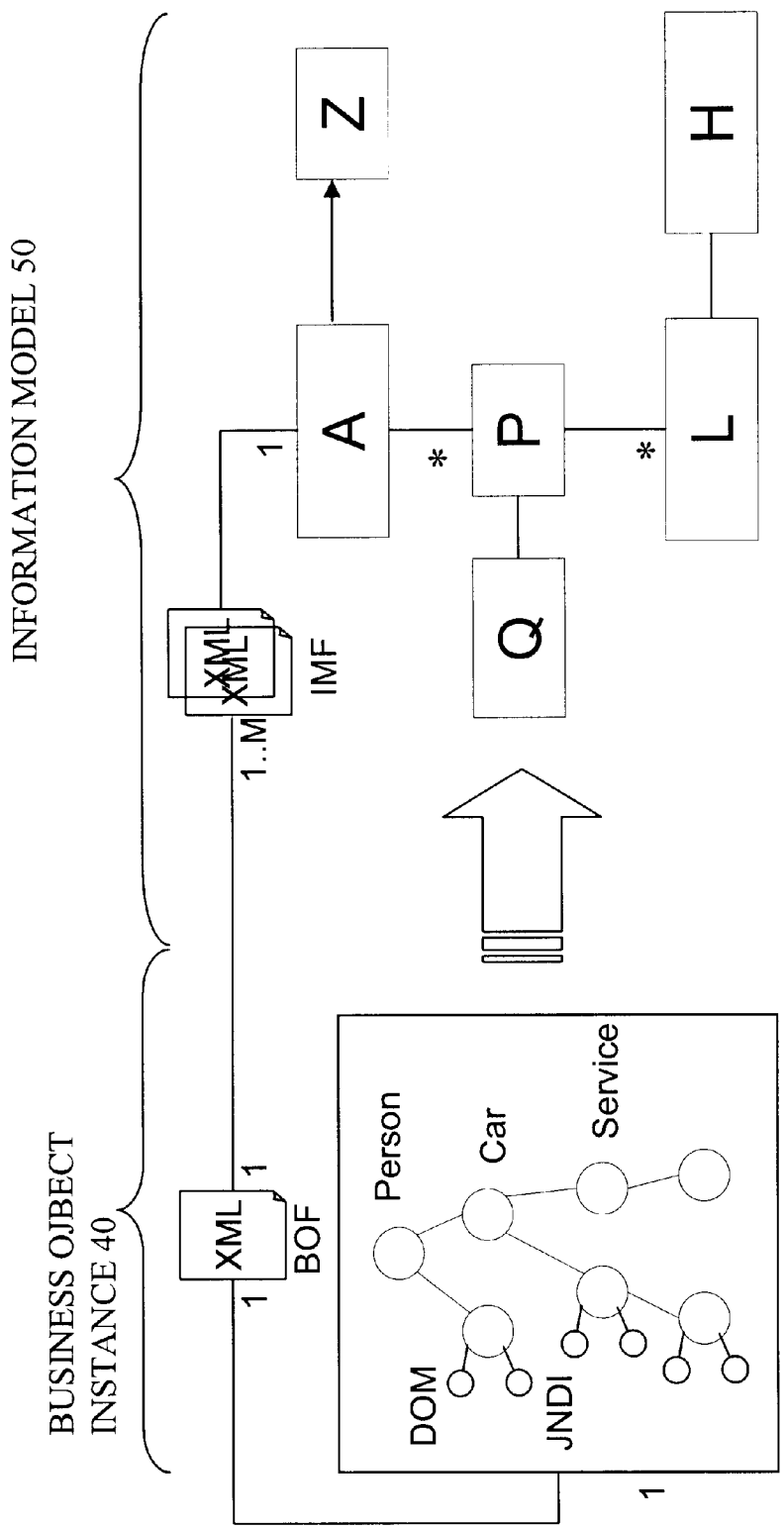
FIG. 2 illustrates a relationship between the information model and business object layers of FIG. 1.
Figure 3:
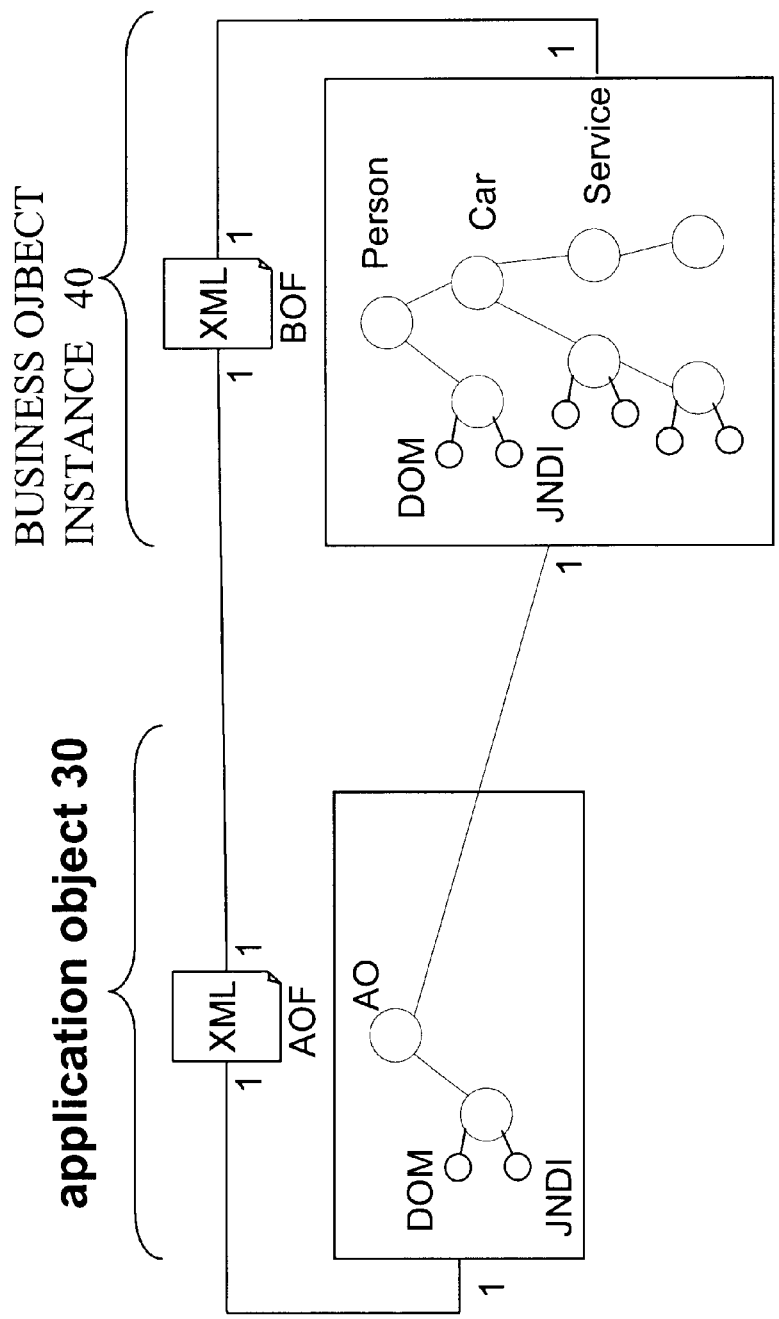
FIG. 3 illustrates a relationship between the business object and application layers of FIG. 1.

The separation of the IM from its next highest level, the business objects, is accomplished by having the IM deal with the sum of all information. The business objects handle various views of the information suitable for different uses. As an example, one business object could be constructed to deal with several use cases for the accounting department. An illustration of the relationship between the IM and a business object instance is illustrated in FIG. 2.

The IM is separated from its next lowest level, the database layer, by freeing it from concern of how it is mapped against tables in a relational database. The configuration of information stored in tables, the specification of indexes, partitioning, extent sizes and growth factors etc. are dealt with in the database (DB) domain, which is for the database administrator (DBA).

As previously discussed, the DB domain is the most operational. Changes may be made to make the system perform better. Denormalization, as well as any other action stemming from how information is used, may be accomplished in this layer.

However, developers are not constrained to work against a physical database design that changes as an application matures, requiring constant modification. This is particularly advantageous because the physical designs are subject to possibly arcane conventions imposed by a particular database management system (DBMS).

The database design level, therefore, is the domain of the database administrator. The database layer specifies the database design at the physical level with physical names of tables and columns, respecting the naming constraints of the DBMS or implementation language (table names eight characters, column names sixteen, all uppercase, no hyphens, etc. . . . ).

The Information Model contains a normalized version of the database design, allowing meaningful names to be used for entities and attributes, and enabling additional documentation to be specified, making the model easier to understand. Categories of information used by the applications are defined without regard for implementation or optimization concerns. Entities, the relationships among them, and the attributes that describe their information content, can have names that are meaningful to their business uses because they are not constrained by the DBMS-specific restrictions in the Database Design. So physical database design changes, such as optimizations, should be reflected only as far as mapping to the information model layer, leaving the Information Model unchanged.

Construction of the Information Model is accomplished in an Information Model Definition Language (IMDL), which is implemented as an XML DTD (Document Type Definition). There is one XML file for each entity, and an XML file, called schema.xml, containing a list all of the entities (ent file).

Table 1 shows construction of the schema, which is a simple listing of all of the definitions to include in the schema.

TABLE 1

The Schema

```
<?xml version="1.0" encoding="UTF-8"?>
<!DOCTYPE IM Schema SYSTEM
"http://www.eonwrx.com/framework/common/dtd/imschemadl.dtd">
<IM Schema root=http://www.eonwrx.com/app/casetracking/im/
id="xxxxxxxx" name="CaseTracking">
    <ent file="AddressUsage.xml"/>
    <ent file="Case.xml"/>
```

TABLE 1-continued

The Schema

```
<ent file="ContactMechanism.xml"/>
<ent file="ContactMechanismUsage.xml"/>
<ent file="Content.xml"/>
<ent file="ContentElement.xml"/>
<ent file="ContentElementType.xml"/>
<ent file="ContentEvent.xml"/>
<ent file="ContentEventType.xml"/>
<ent file="ContentLink.xml">
<ent file="Country.xml"/>
<ent file="CountryArea.xml"/>
<ent file="CountryTimezoneLink.xml"/>
<ent file="CRM Element.xml"/>
<ent file="Dialog.xml"/>
<ent file="DialogPartyLink.xml"/>
<ent file="ElectronicAddress.xml"/>
<ent file="Email.xml"/>
<ent file="GeoCode.xml"/>
<ent file="OrganizationalElement.xml"/>
<ent file="Person.xml"/>
<ent file="PostalAddress.xml"/>
<ent file="Posting.xml"/>
<ent file="TeleComNumber.xml"/>
<ent file="Thread.xml"/>
<ent file="Timezone.xml"/>
<ent file="URL.xml"/>
</IM_Schema>
```

The schema has the attributes id, name and root. The id is used for versioning purposes and is the 'technical name' for the schema. The name is the logical name of the schema, used in the database and in generated SQL (Structured Query Language) statements. The name should be unique among all the schemas used in the database. The root is a URN (Uniform Resource Name) identifying the root directory to use for the entity names. The DTD for the schema is shown in Table 2.

TABLE 2

The schema DTD

```
<?xml version="1.0" encoding="UTF-8"?>
<!--A Schema consists of 0 or many Entity instances and must be consistent.-->
<!ELEMENT IM Schema (ent*)>
<!ELEMENT ent EMPTY>
<!ATTLIST ent
    file CDATA #REQUIRED
>
<!ATTLIST IM Schema
    id NMTOKEN #IMPLIED
    name NMTOKEN #REQUIRED
    root CDATA #REQUIRED
>
```

After all the entity files are created and the schema file reflects all of the entity files that are part of the schema, the schema definitions can be installed in the database. Referring to FIG. 2, the Information model 50 is represented by a plurality (1 ... M) XML entity files. Each Entity is defined in a separate XML file in IMDL. In this manner, the information model appears as a plurality of XML files to the business object layer. The name of the entity definition file should be the same as the name of the entity. The entity definition includes the name, the entity's attributes (called items to avoid confusion with XML element attributes and other use of this popular term), and relationship definitions. A sample entity definition is depicted in Table 3.

TABLE 3

Entity Definition

```
<?xml version="1.0" encoding="UTF-8"?>
<!DOCTYPE Entity SYSTEM
"http://www.eonwrx.com/framework/common/dtd/imdl.dtd">
    <Entity id="101" name="Country">
        <Item name="code" required="true">
            <Adapter factoryKey="String">
                <Map>
                    <String value="size"/>
                    <Integer value="12"/>
                </Map>
            </Adapter>
        </Item>
        <Item name="description" required="false">
            <Adapter factoryKey="String">
                <Map>
                    <String value="size"/>
                    <Integer value="12"/>
                </Map>
            </Adapter>
        </Item>
        <Role name="country">
            <Relationship navigationName="countryArea"
                            remoteRole="CountryArea.countryArea"
                            remoteMultiplicity="1..*"
                            cascadingDelete="false"/>
            <Relationship navigationName="timezones"
                            remoteRole="CountryTimezoneLink.
                            timezones"
                            remoteMultiplicity="0..*"
                            cascadingDelete="true"/>
        </Role>
    </Entity>
```

The definition of Table 3 defines an entity called Country, and the entity is given a numerical identifier id="101". It is also possible to create a derived entity (inheriting from a super entity). This is done by using the attribute extends (not shown in the sample).

The name of the entity should be unique within the schema. The numerical id is used internally, and is, among other things, used when constructing references pointing to an instance of this entity class. If the class is renamed, the numeric id should be kept. It should be noted that the numeric id should be unique as well.

The attributes of an entity are called items and are declared as shown at lines 4–11 and 12–19 in Table 3 using the <Item> tag. The attributes of the item-tag are name, to define the name of the item, an optional required attribute (boolean) defaulting to true making the corresponding attribute of the Item required. There is also an optional attribute called unique (boolean) defaulting to false for specifying whether the value of the Item has to be unique.

It should be noted that items are not used for references (relationships), i.e., an item cannot hold a reference (in SQL terminology the foreign key) to another object.

An entity can optionally play a number of roles. For each such role, there is a number of relationships to roles of other entities (refer to Table 3).

Constraints, which are not illustrated in the sample, may be specified for the entity. Table 4 contains an example DTD for a constraint that deals with more advanced forms of uniqueness than the simple unique attribute available at the item level.

TABLE 4

The DTD for Constraint and Unique:

<!ELEMENT Constraints (Unique)+>
<!ELEMENT Unique EMPTY>
<!ATTLIST Unique
    name NMTOKEN #IMPLIED
    properties CDATA #REQUIRED
>

The Unique constraint may span over one or more named properties (line 5). The "properties" attribute is a comma separated list of names where each name denotes either the name of an item or the navigation Name of a relationship that has its remote multiplicity set to "1". The unique constraint may also have a "name" of its own which can be used as an informative tag when the constraint is violated. The unique contraint of table 4 implements a constraint which constrains the underlying entity to the items or navigation names identified in the properties list. The constraint is "unique" because each named property has a multiplicity of one (i.e., it only refers to one instance, as explained below).

After Items are configured, they must be defined. Referring back to the previous example, an item definition from Table 3 is set out below.

TABLE 5

```
<Item name="code" required="true">
    <Adapter factoryKey="String">
        <Map>
            <String value="size"/>
            <Integer value="12"/>
        </Map>
    </Adapter>
</Item>
<Item>
```

An item must have a sub element called Adapter to specify certain characteristics about the item, such as type. The independence and separation of the adapter element makes the adapter element reusable. Reusable data-types may be built and included in item elements using XML Entity references.

The adapter element has one attribute; factoryKey that is used to specify the element type. For item adapters the possible factory keys are outlined in Table 6.

TABLE 6

Item Adapters and Possible Factory Keys

| Factory Key | Factory Data |
| --- | --- |
| BigDecimal | scale, precision, defaultValue |
| Binary | size, defaultValue |
| BLOB | defaultValue |
| Boolean | defaultValue |
| Byte | default Value |
| CLOB | defaultValue |
| Date | defaultValue |
| Double | defaultValue |
| Float | defaultValue |
| GUID | defaultValue |
| Integer | defaultValue |
| Long | defaultValue |
| Short | defaultValue |
| String | size, defaultValue |

TABLE 6-continued

Item Adapters and Possible Factory Keys

| Factory Key | Factory Data |
| --- | --- |
| Time | defaultValue |
| Timestamp | defaultValue |

The factory keys correspond to the data-types available in JDBC. The adapter element accepts an optional Map element, used to pass factory data, i.e., parameters used when the item object is created by the specified factory.

The defaultValue factory data allows the specification of a value that is stored in the database if a value is not supplied. Naturally the factory data for this key must match the data type. The size key is used to specify the largest size allowed for String and Binary factory key.

The set of factory keys may contain more keys and may specify internationalization settings (how items are formatted and scanned), and the setting of hints that are useful as defaults in other parts of the system.

A map is an object where it is possible to store and retrieve values (any object) given a key ("name"). The key can also be any type of object, but the most commonly used keys are magnitudes (like strings and numbers). A map is specified using the Map element tag. The map element does not have any attributes, but expects a list of key-value associations which may possibly be empty. Table 7 contains a sample where the string "name" is the key, and the String "Jane Doe" is the value.

TABLE 7

Sample Map

```
<Map>
    <String value="name"\>
    <String value="Jane Doe"\>
</Map>
```

The different types of objects include:

List—a list of objects that may be of mixed types.

Map—a list of key-value associations. Both key and value can be any type of object.

Association—an object that associates two objects. Typically an association is used as a key-value pair. Note that in a Map element you should use key-value pairs, and not Association elements as the Map element expects the list of sub elements to be balanced (you can however use an association as a value or key). An example is set out below:

```
<Association key="name"\>
    <String value="Jane Doe"\>
</Association>
```

String, Double, Float, Long, Integer, Short, Character and Byte—correspond to typical software types and are specified using a value element attribute. A String has unlimited length. Long integers are 64 bit, Integer is 32 bit, and Short is 16 bit. A Character has the necessary size to hold a UNICODE character. Byte is 8 bits. The example below shows the code for defining each type with a value.

TABLE 9

```
<String value="name"\>
<Double value="3.1415"\>
<Float value="3.1415"\>
<Long value="42"\>
<Integer value="42"\>
<Short value="42"\>
<Character value="a"\>
<Byte value="255"\>
```
Date - specified by using the attributes year, month and day.
```
        <Date year="2001" month="3" day="8"\>
```
Time - the Time element is used to describe a wall-clock time
and is specified by using the attributes hour, minute and second
as follows:
```
        <Time hour="10" minute="15" second="30"\>
```
Timestap - the Timestamp element is used to describe a point in time
and is specified by using the attributes year, month, day, hour, minute
and second as follows:
```
<Timestamp year="2001" month="3" day="8" hour="10" minute="15"
second="30"\>
```
True/False - As a convenience the boolean objects true and false are used
(rather than a boolean element type with a value attributes set to either
true of false).
The code is formatted as follows:
```
    <True\>
    <False\>
```

With respect to the time related types, the entered value is interpreted in accordance with the locale settings of the computer where the specification is parsed. Alternatively, locale settings may be included in the descriptions to make them independent of the locale where the file is used.

It should be noted that all of the above-referenced time elements describe a point in time and not a span (length) of time, i.e., they are used to describe when rather than how long. To describe a time span, a dedicated object would simply have to be created. Without such an object an integer of a suitable size and resolution (i.e. seconds, minutes, hours etc.) may be used, possibly with a decrement function to count down the desired elapsed time.

Each entity can play a number of roles, each of which may have one or more relationships. The relationships are specified with code like the example of Table 10.

TABLE 10

Relationship Specification

```
<Role name="country">
    <Relationship navigationName="countryArea"
        remoteRole="Country Area.country Area"
        remoteMultiplicity="1..*"
        cascadingDelete="false"/>
    <Relationship navigationName="timezones"
        remoteRole="CountryTimezoneLink.timezones"
        remoteMultiplicity="0..*"
        cascadingDelete="true"/>
</Role>
```

The Role element is used to name the role using the element attribute name. The only allowed sub-element is zero or more Relationship elements.

A Relationship element is used to connect two entities by their roles. The following attributes are available:

navigationName specifies the name by which the remote Entity is known. The navigationName may be excluded to disable navigation in this direction.

remoteRole is the name of the remote Entity. The format includes a period (.) and the name of the Role that the remote Entity plays in this relationship, e.g., Person. author indicating a Person in the role of an author.

remoteMultiplicity specifies how many remote instances this Entity connects to. It is expressed as a UML multiplicity range, i.e. 1, 0 . . . 1, 1 . . .* or m . . . n (where * is unlimited, m and n are positive integers). Many to many relationships are not directly supported.

cascadingDelete specifies if the remote Entity should be deleted when the local Entity is deleted, i.e. if the relationship is a UML Composition.

In the above-referenced manner, the Information model, through its various entities (having respective attributes, relationships and behavior) implemented as XML files, provides access to the data in the underlying database.

As user needs change, the database design is subject to optimization as the application matures. Under the present invention, optimization is confined to a single layer of the specification, minimizing the impact of change. If the physical database design is altered by a DBA, only the mapping between the database design layer and the information model layer has to be altered. The information model itself can remain unchanged.

Business Objects

A business object (BO) is a customized view of an information model selection configured to support a particular use. As set forth above, from the perspective of the business object layer, the information model layer is the database. The existence and structure of the database layer is transparent to the business object layer.

Business objects define business-level views on the information model layer below itself, together with operations to manipulate the data subset. In other words, a business object represents a number of related database transactions that make more sense in a business context than in the elements of the information model layer, which are too objective for the needs of non-technical users in the system. In the example of FIG. 2, the business object instance selects portions of the abstract information model (organized as abstract objects A, Z, P, Q, L, H) to generate a relationship tree which is more useful to its business purpose (organized as person, car, service).

While the information model describes what information a business uses, the business objects layer specifies how the business uses the information. The different information requirements are satisfied by different objects. Being a view of the underlying information model, each object selects just the entities, attributes and relationships needed to address a particular information requirement.

For example, an order entry clerk has a requirement to deal with customer orders. You can define an Order Entry object with attributes from five different entities, listed in Table 10.

TABLE 11

Example Entities and Attributes

| Entity | Attributes |
| --- | --- |
| Customer | Customer number, name, postal code |
| Customer Order | Order number, date placed |
| Dispatch note | Date fulfilled, dispatch note number |
| Product entity | Product name, description |
| Order Line | Quantity ordered, price agreed |

You can then define the actions that apply to the Order Entry object: creating an instance, retrieving an instance by Order Number, updating a retrieved instance, or deleting one. Each action involves the five entities listed above. Traditionally, each action would require extensive coding.

Under the architecture of the present invention, however, since the underlying information model knows how the entities are related, the object definition can use that knowledge to generate access paths by itself so that no coding is required.

Therefore, specifying the actions that apply to an object is trivial. Defining the functions create, retrieve, update, or delete is sufficient to satisfy the system needs. These functions are always available unless blocked (e.g., by making the object read-only).

Business Objects contain no assumptions about how users might navigate between them, nor do they specify how they appear in a finished application. Such concerns are separated out to other, higher layers. Such context-independence makes the business object definitions reuseable.

The business rules layer specifies the referential integrity constraints and validations. The object automatically adheres to these rules, by virtue of the fact they are bound to the entities, attributes and relationships it uses so that, again, no additional coding is required.

Because a BO supports one or several use cases, it should be free of concern from the details of its use. As an example, an account business object encapsulates a complex information model, where an account is actually implemented using many different objects. The created business object is an abstraction of all the various account types available. This business object will be involved in many use cases such as: transfer of funds from one account to another, wire transfer, deposit, and withdrawal. The task of handling the different uses to which the information is put is allocated to the application objects, separating the BO from its next higher level, the application object.

Likewise, the BO layer should not be concerned with the technicalities of interaction protocol or any user interface issues so that its free of concern from underlying communication mechanisms such as HTTP, message queue, remote method invocations, and issues of rendering HTML, which is handled by the higher layers.

However, since business objects are created for a specific purpose (one or several use cases) the business object is not totally free of concern in the widest use of the term. Business objects should be constructed to suit the use case needs without being concerned about the information model and database to provide separation from the lower levels.

A business object instance is a tree of nodes with its specifications expressed in a Business Object Definition Language (BODL), which is an XML DTD that describes how the instance graph should be constructed. There is one XML in BODL for each business object.

The graph is built using XML, which is more than just a text representation. The XML Document Object Model (DOM) describes an application programming interface (API) for dealing with an XML "documents". The actual document content does not really have to exist as long as the user of the document perceives it to exist. An example would be some mathematical calculation like sin(a). It is possible, for example, to construct a document so that it appears to contain all the possible values of sin(a) for any a when it is actually a function that provides the value. Therefore, a virtual XML document is simply a document that is produced by some function so a business object is represented in memory as an XML document while the actual content for the "document" is provided by underlying functions. In this manner the business object "appears" to the application layer as an XML document. Construction of the instance graph is controlled by the BODL XML document.

Typically, XML documents are accessed via one of the two standard interfaces; Serial Access XML (SAX), or DOM.. SAX provides a peephole view of XML—the document is read as a stream, whereas DOM gives you "random access" to any part of the document.

The nodes in the graph are of various types; in DOM all content is captured in some kind of node. An XML Element with an attribute would be represented with two nodes; an element node, and an attribute node. Discussion of this abstraction level is beyond the scope of this invention and therefore, the XML documents will be described in terms of elements, sub-elements and attributes.

Elements in the BO document can be of a Set type, a Composite type or an Item type. A set type is a set (collection) of potentially many (may contain zero or one) composite instances.

The simplest composite is a representation of a information model object and some of its items, but a composite can be a view of a much more complex underlying structure, and can also represent aggregated or derived data. A composite can recursively contain other composite objects; either single instances or a Set (many). A Composite has items, or attributes.

An Item element is used to represent the attributes of the business objects. It should be noted that the attributes of item elements are considered to be the item element's meta data. In other words, view the item element as data, the attributes of the item elements can be considered meta-data, because they define the characteristics of the data (i.e., they are data about data).

The nodes of an XML element are assigned a corresponding behavior by controlling the BO's behavior with an adapter mechanism because standard XML cannot assign behavior. The framework under the present invention should contain pre-existing adapters and the ability to create new adapters without getting involved in the intricacies of writing a DOM compliant object.

Operations may be performed on the business object element graph with the regular XML DOM API, which may be used to manipulate the graph to insert, update and delete elements. All changes made to the graph are recorded, and, with a save operation, take effect in the persistent store.

The intermediate saving of changes preferably takes place in a distributed cache allowing the business object state to be shared among multiple servers.

Construction of the graph begins with the root. The root is either an instance (a single composite object), or a Set of composite objects. The BODL elements used are <Instance> and <Set>.

The Instance element attributes are:

name—the only required attribute and should be set to the element-tag wanted in the resulting graph. The name is typically chosen to reflect the role of the instance vis-a-vis the parent node. An example is provided below:

```
<Instance name="root">
    <Composite name="Person" ....>
    ...
    </Composite>
</Instance>
This would produce the result:
<root>
    <Person>
    ...
    </Person>
<root>
``` disjunct (true, or false)—an optional attribute and a boolean expression where true indicates that the resulting node is obtained without following any specified relation from the parent element, i.e., the node is disjuncted from the parent. A relationship may however exist at a higher abstraction level, e.g., this year's revenue compared to last year's, the value of a specific car compared to the value in average of all cars of the same make. The disjunct attribute defaults to true when an instance element is the root of the graph, and false otherwise. Disjunct defaults to true at the top (or root), because a root instance of the graph does not follow a relation from an information model object.

navigationName—the navigationName attribute is used to specify the relationship from the parent element to the wanted element. In its simplest form it is the name of a relationship, but a more complex navigation name, such as a dot-notation name, can be used. However, the cardinality of the navigation should be correct. For example, it is not possible to use a many relationship in an Instance specification. In addition, none of the relationships in the navigation can be a many relation. When constructing the navigation name (the path) only the names of relationships should be included, not the names of the entity objects. As an example if a Company has a relationship CEO to a Person entity that in turn has a companyCar relationship to a Car entity and you want to access the Car entity, then the navigation name should be "CEO.companyCar", skipping the Person entity. The navigationName attribute should not be used if disjunct is set to true.

readOnly (true or false)—The readOnly attribute can be set to true to indicate the content is read-only and cannot be modified. The default is false.

The sub elements of the Instance element are a Composite, an optional Collaboration, and an optional Constraint explained in detail below. In general, a Collaboration specifies the cooperative behavior between an element and its parent, a Constraint allows you to select a specific instance, and a Composite is used to describe the "data" itself. The three sub element types are also used in a Set.

The Set element is used to describe a set of composites. The resulting set can contain zero or more composite instances. Its attributes are:

name, required disjunct (true, or false), optional navigationName, optional readOnly (true or false), optional The name and disjunct attributes are the same as for the Instance element. An example of code to construct a Set element follows:

```
<Set name="Employees">
    <Composite name="Employee" entity="Person" ....>
    ...
    </Composite>
</Set>
```

As explained in more detail below, the entity attribute specifies the name of the underlying entity in the information model layer when it is different from the name attribute.

The code above produces the result:

```
<Employees>
    <Employee> ... </Employee>
    ...
    <Employee> ... </Employee>
</Employees>
```

The Set element has the same attributes with the same rules as the Instance element. The sub elements of Set are the Composite and the following, all of which are optional: Adapter, Collaboration, Constraint, ElementCollaboration, and OrderBy, explained in detail below. In general, an Adapter is used to specify the class, or the behavior, of the element. Collaboration, Instance, Composite and Constraint are the same as for the Instance element. The ElementCollaboration is similar to Collaboration but defines the cooperation between the Set itself and the elements. Finally, OrderBy allows you to specify the ordering of the instances in the set.

The Composite element represents the data and can be as simple as a "record" (an object with attributes) or be a complex tree of instances and sets of composites. The attributes of the Composite are:

name, required, used to specify the resulting element-tag.

aggregation (true or false), optional, the aggregation attribute is a boolean, that when set to false, causes the element to represent an identifiable object (e.g. an information model object), and when set to true, represent an aggregation such as produced by the SQL statements MAX, MIN, AVG, GROUP BY, etc. The default is false.

entity, optional, this attribute is used to specify the information model Entity if the name of the entity differs from the wanted element tag (as set by the name attribute). This attribute is invalid when the element is of type aggregation.

alias, optional, makes it possible to give a composite an additional unique name. The alias is not exposed outside the system so short names can be used. The alias is necessary in one situation, and an optional convenience otherwise. The alias must be used when you need to refer to a specific parent element that without the alias would not have a discriminatory name.

The sub elements of Composite are an optional Adapter, one or more Item elements, and zero or more of Instance elements, Set elements, and Subclass elements.

The Instance and Set elements are those discussed above. The Adapter element is used to specify the behavior, i.e. the class of the element, and the Item element is used for the 'attributes' of the represented object, e.g., the name of a person. The Subclass element is used to specify the treatment of instances that are subclasses of the specified entity, e.g., how to handle instances of classes Teacher and Student having the common super class Person when the name (or select) attribute of the element is Person.

Item is used when objects are contained by value. Instance or Set is used when objects are contained by reference, Instance for a single object, and Set for a collection of objects.

Objects contained by value are always treated as a unit. Therefore, when the element is saved to the database so are all of the items. Objects contained by reference are ignored by default. The handling of referenced objects is more complex and a Collaboration element is needed to specify the handling. It is also possible to modify the default handling of Item elements by using item collaboration.

It is possible to build, to any degree of complexity, a composite containing multiple sets where the sets contain composites with more sets.

The Item element is used to describe the 'attributes' of the represented object. The value of an item is made by value.

The attributes of the Item element are:

name, required, should be set to the wanted tag-name.

select, optional, the name of the Item to fetch if different than the tag-name (used by default), or if a more complex statement is needed. Below is an example where both name and select are used:

```
<Composite name="Person">
    <Item name="birthDate"\>
    ...
    </Item>
    <Item name="employer" select="employeer.name" \>
    ...
    </Item>
</Composite>
```

Which produces the output:

```
<Person>
    <birthdate>1959-03-08</birthdate>
    <employer>the eon company</employer>
<Person>
readOnly (true or false), default is false.
```

The sub elements of Item are an optional Adapter to specify the behavior, and an optional Collaboration to specify the cooperation between the item and its parent.

The item adapters for the business object are the same as for the information model object.

The Collaboration element is specified in the same way as an adapter (i.e. a factory key, and factory data.).

The Subclass element is used inside a Composite element to define how to handle classes derived from the specified Entity. The attributes of the Subclass element are:

name, required, set to the wanted element-tag.

entity, optional, set to the name of the entity if different than the wanted tag.

The sub elements of Subclass are the same as for Composite except the use of an Adapter is not allowed (i.e. Item, Instance, Set and Subclass are allowed).

The Subclass element is used when there is a relationship to some entity and the particulars of the entity require certain items and more complex graphs. For example, assume there is a Vehicle entity with the derived classes Motorized and NonMotorized. From Motorized there are further derivations; Car, Truck, and Airplane, and from NonMotorized; Bicycle, Skateboard, and Rollerskates. In the resulting graph you want all nodes for motorized vehicles to include a sub element for horsepower, and for bicycles you want to include a node for the number of gears. To do so requires:

```
<Subclass name="Motorized">
    <Item name="horsepower" select="motorEffect"/>
</Subclass>
<Subclass name="Bicycle">
    <Item name="numberOfGears"/>
</Subclass>
```

All the super classes do not have to be specific as with Bicycle. The system attempts to find a specification for the instance, if no specification is found an attempt is made to find a specification for its super class, etc. until either the composite entity is reached or a specification is found. It is therefore illegal to have multiple specifications for a class.

The architecture of the present invention allows nesting of the specifications; i.e. a Subclass inside of a Subclass. This construction is useful when all derived classes should expose some common items from a super class. For example:

```
<Subclass name="NonMotorized">
    <Item name="methodOfPropulsion"/>
    <Subclass name="Bicycle">
        <Item name="numberOfWheels"/>
    </Subclass>
    <Subclass name="Rollerscates">
        <Item name="inline"/>
    </Subclass>
</Subclass>
```

In this example there was no need to repeat the specification of "methodOfPropulsion".

The system allows referral to items in super classes, which is necessary to show different items from a common super class for different sub classes. So the earlier example could have been written as follows:

```
<Subclass name="Bicycle">
    <Item name="methodOfPropulsion"/>
    <Item name="numberOfWheels"/>
</Subclass>
<Subclass name="Rollerscates">
    <Item name="methodOfPropulsion"/>
    <Item name="inline"/>
</Subclass>
```

The OrderBy element is used in Set elements to specify an ordering of the instances in the set. Its intended to group a sequence of OrderByItem elements to first, secondary, etc. sorting order.

The attributes of the OrderByItem element are:

name—name of the item to order by.

mode (ascending or descending), optional, set to ascending by default.

It should be noted that it is not possible to sort a set based on items specified for sub classes.

Below is an example where a Composite is ordered first by the name of the employer (descending), and then by the person's name. The irrelevant parts of the specification have been omitted in the interest of brevity.

```
<Set name="employees" select="Person">
<Composite name="Person">
    <Item name="name"> . . . </Item>
    <Item name="employer" select="employer.name"> . . . </Item>
</Composite>
```

-continued

```
<OrderBy>
    <OrderByItem name="name"/>
    <OrderByItem name="employer" mode="descending"/>
</OrderBy>
</Set>
```

The Constraint element is used to specify a query constraining the result to the wanted set of instances (or just one if an Instance is used). The Constraint element can be used inside Composite. There is only one attribute; "predicate" that is used to specify the query. The syntax for the query is OQL (a "standard" from ODMG).

When new uses for the information model are identified, existing applications can be easily extended and new ones easily created, just by creating new business objects to support the new area of 'functionality'. Existing business rules and policies are upheld, as the rules that implement them are specified against the data they constrain.

Application Objects and Interaction

Application objects (AO) implement the behavior (the moving parts) behind a user interface. Interaction objects deal with the channel specific interaction between user interface and application objects with a request handler, and a rendering-pipeline for result processing.

Figure 4:
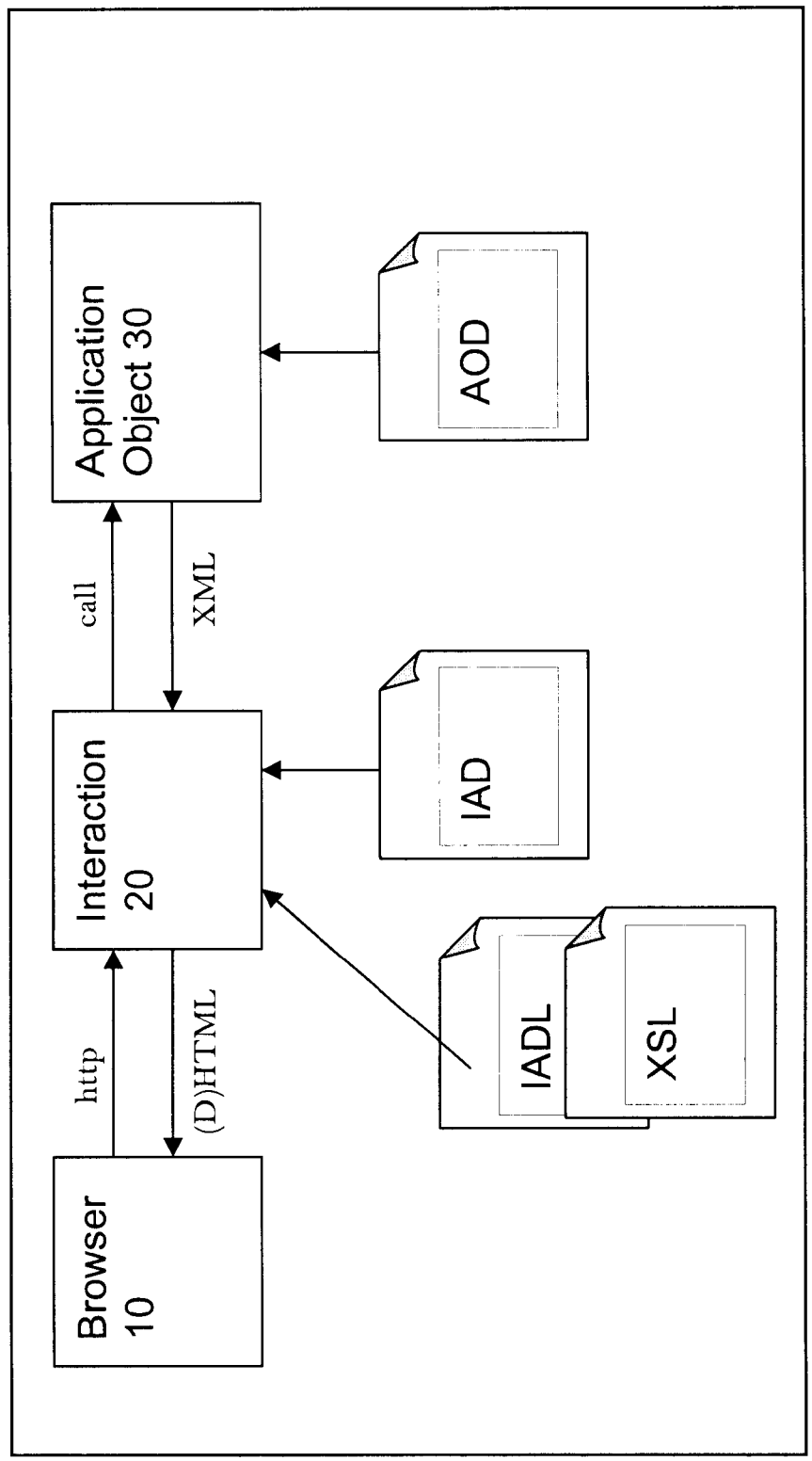
FIG. 4 illustrates application object behavior.

Referring to FIG. 4, application object behavior is implemented in Java and is accompanied by an Application Object Definition (AOD), which is a specification written in an Application Object Definition Language (AODL). AODL, in turn, is implemented as an XML DTD. The AOD specifies (among other things) the facade of the application object and a specification of the methods reachable from the interaction layer.

The Interaction objects are provided as part of the framework of the system, and do not have to be implemented in Java. It is sufficient to define them in an Interaction Definition (IAD) using an Interaction Definition Language (IADL). The IADL, like the AODL, is implemented as an XML DTD. The IAD specifies how HTTP requests are mapped into method calls, and how results should be processed by specifying a rendering pipeline. XSL specifies an XSLT transformation of the data received from the application layer into XHTML, which, in turn, is rendered in a browser (the user interface).

For example, assume in an application for transferring money between accounts, the user interface shows two account-number fields, and a field for the transfer amount. A button with the label "Transfer" will execute the transfer. The application object's role in such an application is to provide the two account objects (business objects) needed for the transfer, and perform the necessary deposit and withdraw operations to effect the transfer. A very simple implementation of the application object could have one method called transferMoney with the parameters amount, fromAccountNumber, and toAccountNumber. Alternatively, the transfer can be done by some other internal methods that are not callable from the user interface. In any event the AOD would be written to expose the transferMoney method to the IAD.

To construct the interaction, a main form is needed where the user can specify the two account numbers and the amount for the transfer. A confirmation page is also needed to indicate the status of the transfer. If the transfer is successful, the confirmation page should so indicate to the user. If the transfer was not successful, a page indicating the errors that occurred is displayed to the user with suggested corrective actions to take.

Once the various rendering pieces are ready, everything is brought together in the IAD where it is specified how to pick up parts of a URL (parameters or parts of the path) and map them into method calls on the AO. A method call returns a status that is used to select a rendering pipeline to process a successful transfer of money differently from any of the errors.

As described above, an Application Object interacts with a Business Object and has no notion of what goes on in the Information Model. From the Application Object's point of view, the Business Object is a facade for the information, and serves to separate the Application Object from its adjacent lower levels. The Application Object should not be concerned with the type of user interface used, how requests from the user interface are handled, or how the result is rendered. An AO does, however, uphold its interface and document type of XML returned from method calls. In other words, the returned XML document type should not be changed. The Interaction layer is separated from lower levels by being free from concern of how Application Object operations are implemented, and like all layers, needs no knowledge of the other lower layers' functionality.

The Interaction layer framework components are also free from concern of the specifics of different user interfaces. This is implemented in the IADs of the interaction layer. The IAD contains a description of the rendering pipeline by specifying XSL files and possibly other transformations. Although all transformations are expressed in XSL outside of the IAD, they are named inside the IAD. Minor changes for variations in a browser are possible, i.e., a name-compatible XSL set of files are used and configured for the specific browser. In other words, if different versions of a file are required for different browsers, separate directories can be created for each browser, with the files in each directory having the same name(e.g. //netscape/hello.xsl for Netscape browser and .//explorer/hello.xsl for Microsoft Explorer browser).

Application objects are constructed by specifying their properties in AODL. In addition to the specification, there must be an implementation of the behavior of the application objects. This behavior is preferably written in an OOP language, such as Java. Naturally, all application objects must conform to the aodl.dtd.

The AO element is the root of the AOD (Application Object Definition). It specifies the name and class (implementation) of the application object.

The attributes of the AO element are:

jndiName—required, name of the application object className—required, should be set to the name of the Java class implementing the application object.

The sub elements of an AO are a Business Object Definition (BOD), and one or more Method elements. Method elements are used to specify the methods that are available to the interaction (and indirectly to the user interface). The purpose of the BOD element is to specify the business object that should be used in the application, and does not have any attributes or sub elements. The name of the business object definition file is simply the content of the element, for example:

```
<BOD>CasETrackingBO.xml</BOD>
```

The Method element is used to specify a method with one attribute, its name, which should correspond to a real method implemented in the AO. There is one sub element type, Argument, where each Argument element specifies one argument. The attributes of the Argument element are:

type, required, specifies the name of a java class. An instance of the class will be used to represent the value as well as to format and scan a string representation of the value.

name, required, used to specify the argument/parameter name. It is used in the interaction definition to connect URL parameters to the method call.

The following is an example of the above principles:

```
<AO jndiName="CaseTracking"
className="com.conwrx.ao.CaseTracking">
    <BOD>CaseTracking</BOD>
    <Method name"findCase">
        <Argument type="java.lang.String" name="boPrimaryKey"/>
    </Method>
    <Method name="findAllCases"/>
    <Method name="addPostToCase">
        <Argument type="java.lang.String" name="boPrimaryKey"/>
        <Argument type="java.lang.String" name="post"/>
    </Method>
</AO>
```

An interaction object (IA) is specified in IADL, a XML file conformant to the iadl.dtd. The root element is an Interaction element which is used to specify which application object to use, and which interactions to use between the browser and the application object. The IA itself can provide some of the actions and relay others to the application object.

The attributes of the Interaction element are:
name, required, name of the interaction
singleton, required, yes or no value The sub elements of Interaction are AOD, and one or more Action elements. The AOD specifies the application object to use, and the Action elements specify how requests from the user interface are handled.

The AOD element specifies the application object used for the interaction. The AOD element does not have any attributes or sub elements. The name of the application object definition file is simply the content of the element. For example:

```
<AOD>CaseTrackingAO.xml</AOD>
```

The Action element specifies how to handle a request from the user interface, a url-pattern to match a specific URL, and how a matching request should be handled. A call can be specified to an AO method (AOCall element), a static result (Result element), and transformations (Transformation element).

The Action element has one attribute, the urlPattern, which is required and consists of a string that is matched against the end of the URL. The code is formatted as follows:

```
<Action urlPattern="/FindCase">
```

The sub elements of the Action element are an optional AOCall element, an optional Result element, and zero or more Transformation elements. The use of AOCall and Result are mutually exclusive. Transformation elements specify a resultKey to handle different types of return from an AOCall (such as success or error).

The AOCall element is used to specify a call to the application object. It has one attribute; method that should be set to the name of the AO method to call. The call arguments are specified using the Argument sub element, and there is one per argument. The attributes of the Argument element are:

position, optional, specifies the position of the argument among all of the arguments (e.g., a position of 2 would indicate the argument is the second argument in the AOCall element.

type (parameter, static or pathpart), required, specifies if the argument should be picked up from the http request (parameter) (the normal way for http get/post), if the argument is a fixed (static) value, or if the parameter is found somewhere in the URL itself (pathpart).

name—optional, the name attribute is the name of the parameter in a post/get.

Exemplary code is shown below:

```
<Action urlPattern="/FindCase">
    <AOCall method="findCase">
        <Argument type="parameter" name="boPrimaryKey"/>
    </AOCall>
    <Transformation resultKey="success" . . . >
    </Transformation>
</Action>
```

The Argument element supports default data that is used if a value for a parameter is missing. The default value is specified as content of the element.

```
<Argument . . . >this is the default value</Argument>
```

The Result element is used instead of an AOCall element. The Result element specifies the result directly. Currently the Result can be a Paneset, which accepts the output into its structure.

The Result element does not have any attributes. It has an optional sub element (Paneset).

The Paneset element is used to specify a set of panes and it does not have any attributes. It has one or more Pane sub elements used to specify a pane in the set. The attributes of the Pane element are:

id, required, a symbolic name.

href, required, specifies the content of the pane. (If you want to start with an empty pane you can use "/empty.xml").

height, optional, specifies the relative height of the element in percent. In the example below, a pane set is specified with two panes each taking up 50% of the available space.

An example paneset is set out below:

```
<Paneset>
    <Pane id="top" height="50%"
href="/casetracking/casetracking/FindAllCases"/>
    <Pane id=bottom" height="50%" href="/empty.xml">
</Paneset>
```

The Transformation element is used to specify the rendering (processing) pipeline for a specific type of result and is a sub element of an Action element which includes an AOCall sub-element, or a Result sub-element plus one, or several Transformation sub elements. The result to transform is what the AOCAll or Result produces. The result should always contain a result key. The result key is a keyword such as "succeeded", "failed", or "overflow", but is not limited to being used only as a success/error code. It could equally well represent a certain step in a sequence (compare to a Wizard). The result key should be included in the result as an XML processing instruction.

The attributes of a Transformation element are:

resultKey, required, is used to connect the Transformation to a result. The result to process should have the same result key specified as a processing instruction.

xml:lang, optional

There are no regular sub elements for Transformation. Processing instructions are used to specify the processing pipeline and they appear as sub elements even if they are not specified in the DTD.

The processing instructions available are:

xml, stylesheet cocoon, process

An example of exemplary code is set out below:

```
<Transformation resultKey="error">
    <?xml-stylesheet type="text/xsl" href="sorry.xsl"?>
    <?cocoon-process type="xslt"?>
</Transformation>
```

The user interface may be implemented as a browser. In a particularly preferred embodiment of the present invention, the browser is implemented with a model view controller, as described in U.S. patent application Ser. No. 09/768,389, filed Jan. 24, 2001, entitled "Model View Controller", the entire disclosure of which is hereby incorporated by reference. The browser is operable to access the database and download a mirror copy of at least a portion of the relational tree of the business object layer along with a web page form which contains fields for receiving and/or displaying information, and optionally a controller utility. Each node in the mirror copy constitutes a client side model. In accordance with this embodiment, each field has associated therewith one of the client side models. An executable process, either on the web page form and/or on the controller utility controls the manner in which the information in the client side models are displayed in their corresponding fields (or "views"), and may further provide client side processing of information input to the fields by a user of the browser. It should be noted that although each field on the web page form (e.g., an HTML form) must have a corresponding model, a single model may drive a plurality of fields. The executable process, in accordance with instructions contained in web page form, can update the relational tree of the business object layer to reflect changes made to the client side models.

Although the system and method of the present invention was described in connection with the preferred embodiments described above, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system for transferring information between a user interface and a database over a global information network, comprising:

a plurality of user interfaces located on a plurality of first computers;

an interaction layer on a second computer;

an application layer on the second computer;

a business object model layer on the second computer;

a information model layer on the second computer;

a relational database located on the second computer;

the information model layer maintaining a first relational tree of the information in the relational database, the relational tree appearing as a plurality of entities in a mark up language to the business object layer, the information in the relational database being accessible via the relational tree in the information model layer;

the business object model layer including a plurality of business object instances, each business object instance maintaining a second relational tree corresponding to a portion of the first relational tree, the second relational tree appearing as a plurality of entities in a mark up language to the application layer;

the application layer including a plurality of application object instances, each application object including an application object definition which specifies one or more methods and business object instances available to the application object, the methods being operable to implement behavior requested by a browser using information from the database accessed through the business object instances, the application layer appearing as a plurality of entities in a mark up language to the interaction layer;

the interaction layer including a plurality of interaction objects, each interaction object including information identifying an application object and information specifying a manner in which requests from a user interface are to be processed for transmission to the application object and in which responses from the application object are to be transmitted to the user interface, the interaction layer appearing as a plurality of entities in a mark up language to the user interface; and the user interface located on a client computer, the user interface being displayed from a plurality of entities in a mark up language.

2. The system of claim 1, wherein the entities in the information model layer are defined in XML.

3. The system of claim 1, wherein an entity in the information model includes a name, a set of attributes, and a set of relationship definitions.

4. The system of claim 1, wherein one of the business model instances includes an item element, the item element holding a value of a target object in the information model layer.

5. The system of claim 1, wherein one of the business model instances includes a set element, the set element holding a reference to a target object in the information model.

6. The system of claim 1, wherein one of the business model instances includes an instance element, the instance element holding a reference to a target object in the information model.

7. The system of claim 1, wherein the second relational tree is defined using one or more of an instance element, a set element and an item element, the set element holding a reference to a target object in the first relational tree, the instance element holding a reference to a target object in the first relational tree.

8. The system of claim 7, wherein the instance element is a sub-element of the set element.

9. The system of claim 7, wherein the item element is a sub-element of the set element.

10. The system of claim 7, wherein the item element is a sub-element of the instance element.

11. The system of claim 7, wherein the item element includes a navigation attribute, the navigation attribute identifying a relationship to the target object in the first relational tree.

12. The system of claim 7, wherein the set element includes a navigation attribute, the navigation attribute identifying a relationship to the target object in the first relational tree.

13. The system of claim 7, wherein the instance element includes a navigation attribute, the navigation attribute identifying a relationship to the target object in the first relational tree.

14. The system of claim 1 further comprising an information model definition language for constructing the information model layer wherein there is one file in a markup language for each of the plurality of entities, and the information layer further comprises:
   a schema file including a list of the plurality of entities and a root element identifying a URN of the root directory of the entities; and
   a definition file for each entity, the definition file for each entity including a name for the entity and one or more attributes for the entity, each attribute having an attribute name, a required attribute indicating whether the attribute is required, and a unique attribute indicating whether the attribute must be unique.

15. The system of claim 14 wherein an entity definition further includes a role element, the role element including zero or more relationship elements, each including:
   an remote entity attribute to specify a remote entity; and,
   a multiplicity attribute to specify a number of remote instances the entity corresponding to the entity definition connects to.

16. A computer readable medium containing computer executable process steps operable to control a computer to transfer information between a user interface and a database over a global information network, comprising:
   an interaction layer, an application layer, a business object model layer, an information model layer, and a relational database stored on a computer readable medium;
   the information model layer maintaining a first relational tree of the information in the relational database, the relational tree appearing as a plurality of entities in a mark up language to the business object layer, the information in the relational database being accessible via the relational tree;
   the business object model layer including a plurality of business object instances, each business object instance maintaining a second relational tree corresponding to a portion of the first relational tree, the second relational tree appearing as a plurality of entities in a mark up language to the application layer;
   the application layer including a plurality of application object instances, each application object including an application object definition which specifies one or more methods and business object instances available to the application object, the methods being operable to implement behavior requested by a browser using information from the database accessed through the business object instances, the application layer appearing as a plurality of entities in a mark up language to the interaction layer; and
   the interaction layer including a plurality of interaction objects, each interaction object including information identifying an application object and information specifying a manner in which requests from a user interface are to be processed for transmission to the application object and in which responses from the application object are to be transmitted to the user interface, the interaction layer appearing as a plurality of entities in a mark up language to a user interface. first relational tree.

17. The computer readable medium of claim 16, wherein the entities in the information model layer are defined in XML.

18. The computer readable medium of claim 16, wherein an entity in the information model includes a name, a set of attributes, and a set of relationship definitions.

19. The computer readable medium of claim 16, wherein one of the business model instances includes an item element, the item element holding a value of a target object in the information model layer.

20. The computer readable medium of claim 16, wherein one of the business model instances includes a set element, the set element holding a reference to a target object in the information model.

21. The computer readable medium of claim 16, wherein one of the business model instances includes an instance element, the instance element holding a reference to a target object in the information model.

22. The computer readable medium of claim 16, wherein the second relational tree is defined using one or more of an instance element, a set element and an item element, the set element holding a reference to a target object in the first relational tree, the instance element holding a reference to a target object in the first relational tree.

23. The computer readable medium of claim 22, wherein the instance element is a sub-element of the set element.

24. The computer readable medium of claim 22, wherein the item element is a sub-element of the set element.

25. The computer readable medium of claim 22, wherein the item element is a sub-element of the instance element.

26. The computer readable medium of claim 22, wherein the item element includes a navigation attribute, the navigation attribute identifying a relationship to the target object in the first relational tree.

27. The computer readable medium of claim 22, wherein the set element includes a navigation attribute, the navigation attribute identifying a relationship to the target object in the first relational tree.

28. The computer readable medium of claim 22, wherein the instance element includes a navigation attribute, the navigation attribute identifying a relationship to the target object in the first relational tree.

29. The computer readable medium of claim 16 further comprising an information model definition language for constructing the information model layer wherein there is one file in a markup language for each of the plurality of entities, and the information layer further comprises:
   a schema file including a list of the plurality of entities and a root element identifying a URN of the root directory of the entities; and
   a definition file for each entity, the definition file for each entity including a name for the entity and one or more attributes for the entity, each attribute having an attribute name, a required attribute indicating whether the attribute is required, and a unique attribute indicating whether the attribute must be unique.

30. The computer readable medium of claim 29 wherein an entity definition further includes a role element, the role element including zero or more relationship elements, each including:

an remote entity attribute to specify a remote entity; and,
a multiplicity attribute to specify a number of remote instances the entity corresponding to the entity definition connects to.

* * * * *